(12) United States Patent
Ozaki

(10) Patent No.: US 6,912,061 B1
(45) Date of Patent: Jun. 28, 2005

(54) METHOD AND APPARATUS FOR PROCESSING IMAGE OUTPUT

(75) Inventor: Yoshiko Ozaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 727 days.

(21) Appl. No.: 09/640,687

(22) Filed: Aug. 18, 2000

(30) Foreign Application Priority Data

Sep. 27, 1999 (JP) .......................................... 11-271753

(51) Int. Cl.$^7$ ............................................. G06F 13/00
(52) U.S. Cl. .................... 358/1.15; 358/1.12; 358/1.13; 358/1.14; 358/440; 271/298; 270/58.23; 270/58.18; 270/52.03; 382/128; 382/307
(58) Field of Search ...................... 271/298; 270/58.23, 270/58.18, 52.03; 382/128, 307; 358/1.12–1.15, 440

(56) References Cited

U.S. PATENT DOCUMENTS

| | | | | |
|---|---|---|---|---|
| 4,789,782 A | * | 12/1988 | Ohara .......................... 250/583 |
| 5,361,085 A | * | 11/1994 | Vance .......................... 347/101 |
| 5,435,544 A | * | 7/1995 | Mandel ........................ 271/298 |
| 5,513,013 A | * | 4/1996 | Kuo ............................ 358/448 |
| 5,752,697 A | * | 5/1998 | Mandel et al. ............... 271/288 |
| 5,920,404 A | * | 7/1999 | Weiser ........................ 358/434 |
| 5,953,500 A | * | 9/1999 | Katakura .................... 358/1.12 |
| 5,982,504 A | * | 11/1999 | Yoshida ...................... 358/402 |
| 6,009,804 A | * | 1/2000 | Yamada ......................... 101/2 |
| 6,014,228 A | * | 1/2000 | Castro ......................... 358/400 |
| RE37,031 E | * | 1/2001 | Nishiwaki ................... 358/1.14 |
| 6,546,313 B2 | * | 4/2003 | Nakahira et al. ............ 700/224 |
| 6,657,741 B1 | * | 12/2003 | Barry et al. ................ 358/1.15 |
| 2001/0020229 A1 | * | 9/2001 | Lash ............................. 705/3 |

* cited by examiner

Primary Examiner—Edward Coles
Assistant Examiner—Alan Rahimi
(74) Attorney, Agent, or Firm—Sughrue Mion, PLLC

(57) ABSTRACT

A print server connected to medical diagnostic imaging equipment via a network or dedicated channels, wherein the print server executes a process to identify the device that is the source of image data received via the network or dedicated channels and outputs the image data to a specific sorter bin in a printer based on this source. The image output processor can also selectively choose a sorter bin as an output destination for the image data, based on either attribute data or the device that transmitted the image data, depending on the communication protocol.

17 Claims, 10 Drawing Sheets

| Device ID | Printer ID | Sorter bin ID |
|---|---|---|
| 001 | P001 | S001 |
| 002 | P002 | S003 |
| 003 | P001 | S005 |
| ••• | ••• | ••• |
| nnn | P002 | S007 |

(A)

| Device ID | Sorter bin ID |
|---|---|
| 001 | S0201 |
| 002 | S0105 |
| 003 | S0203 |
| ••• | ••• |
| nnn | S0107 |

| Patient ID | Sorter bin ID |
|---|---|
| C001 | S02201 |
| C002 | S0105 |
| C003 | S02203 |
| ... | ... |
| Cnnn | S0107 |

(B)

| Physician ID | Sorter binID |
|---|---|
| D001 | S0103 |
| D002 | S0106 |
| D003 | S02202 |
| ... | ... |
| Dnnn | S02207 |

(C)

| Device ID | Sorter bin ID |
|---|---|
| M001 | S0104 |
| M002 | S0103 |
| M003 | S02201 |
| ... | ... |
| Mnnn | S02205 |

| Sorter bin selection data ID | Sorter bin ID |
|---|---|
| C001 | S0201 |
| C002 | S0105 |
| C003 | S0203 |
| ⋮ | ⋮ |
| Cnnn | S0107 |
| D001 | S0103 |
| D002 | S0106 |
| D003 | S0202 |
| ⋮ | ⋮ |
| Dnnn | S0207 |
| M001 | S0104 |
| M002 | S0103 |
| M003 | S0201 |
| ⋮ | ⋮ |
| Mnnn | S0205 |

| Channel ID | Printer ID | Sorter bin ID |
|---|---|---|
| 001 | P001 | S001 |
| 002 | P002 | S003 |
| 003 | P001 | S005 |
| ••• | ••• | ••• |
| nnn | P002 | S007 |

(A)

| Channel ID | Sorter bin ID |
|---|---|
| 001 | S0201 |
| 002 | S0105 |
| 003 | S0203 |
| ••• | ••• |
| nnn | S0107 |

METHOD AND APPARATUS FOR PROCESSING IMAGE OUTPUT

BACKGROUND OF THE INVENTION

1. Field of the Invention

The present invention relates to an image output processor and a method thereof for processing print-image data received from various image generating devices connected via a network or similar communication means, and particularly to an image output processor and a method thereof for processing print-image data received from medical diagnostic imaging equipment via a dedicated communication channel, network, or the like.

2. Description of the Prior Art

Various diagnostic imaging devices have come into use in the medical profession in recent years. Some common examples of these include ultrasound (US) diagnostic equipment, magnetic resonance (MR) scanners, computed tomography (CT) scanners, and computed radiography (CR) scanners. Such diagnostic imaging apparatus are referred to as modality equipment. Image data acquired with these modalities is printed out on film printers, archived on storage media, or processed in other ways.

When performing a CT scan, for example, the examiner operates the CT scanner to obtain tomographic images of the patient. These images can be displayed on a video display in the console of the device. By operating a film recorder called an imager, which is connected to the CT scanner, the examiner can specify images needed for the diagnosis. The specified images are output to the imager and printed out on large film sheets using a film printer. This film is provided to the physician in charge as a diagnostic image for assisting in diagnosing the patient.

Ordinarily, several frames of diagnostic images are laid out on one sheet of film. Attributes identifying the images are often recorded on the film along with the diagnostic images. Depending on the necessity, these attributes might include the patient's name, sex, birth date, ID, physician, date of the examination, conditions of the examination, and the like.

Generally, the above-described modalities are each connected to their own individual printer for printing out the image data scanned by these apparatus. However, it is also common for a plurality of modality equipment to share one printer. In this case, the plurality of modality equipment is connected to a print server via dedicated channels or a network, such that image data from the plurality of modality equipment can be output to one printer.

When the plurality of modality equipment is configured to share one or more printers, data is received from the various modalities via a dedicated communication channel, network, or the like and output to the printers. In order to facilitate sorting the outputted image data for each patient, the patient ID included in the transmission data is identified and the printer sorter bin is selected based on this patient ID.

In other words, regardless of whether the imaging apparatus is an MR scanner, a CT scanner, or another imaging device, the patient ID is transferred to the printer as attribute data along with the image data from the modality. On the printer end, the ID is identified and the sorter bin switched accordingly.

Take for example a system that includes a plurality of modality equipment, a server, a monitor, a printer, and the like connected by a network. The devices are connected transparently on the network by following a prescribed communication protocol. Using the Open system Interconnection (OSI), which is a model for communication standards, the physical and data link layers of the network employ the Ethernet protocol, while the network and transport layers employ Transmission Control Protocol/Internet Protocol (TCP/IP). The session, presentation, and application layers employ vendor-specific protocols used by the manufacturers of the medical equipment.

One common protocol in the field of medicine is Digital Imaging and Communication in Medicine (DICOM). DICOM is a communication protocol used for medical images that was established by the American College of Radiology (ACR) and the National Electrical Manufacturers Association (NEMA). The DICOM protocol stipulates the format for data transmitted from modality equipment and manages a large variety of attribute data. Examples of this attribute data include a patient ID, print image layout, frame number, film size and type, image polarity, density, and number of output sheets.

The attribute data managed by the DICOM protocol are distinguished by several bytes of identifiers normally called tags. The image data is also distinguished by tags. Data is transmitted in the form of a data array constructed of a plurality of combinations of tags and attribute data, tags and image data, and the like, with an End of File (EOF) code attached at the end of the data array. A device having a DICOM interface corresponding to this DICOM protocol receives the data array, identifies each portion of data and attribute data based on the tags, and processes the data according to the attribute data.

One possible process that can be performed based on data transmitted using the DICOM protocol is to change sorter bins based on the patient ID in the attribute data defined by the DICOM protocol. As described above, the DICOM protocol enables the transmission of attribute data such as a patient ID. A print server or other device possessing interface capable of handling the DICOM protocol reads the patient ID from the attribute data attached to the image data, selects a prearranged sorter bin of a printer based on this patient ID, and outputs the image data to the selected sorter bin.

However, there are numerous medical apparatus such as the CR, MT, and CT scanners that are only capable of communicating using a different protocol from DICOM. These protocols might be vendor-specific protocols created by the manufacturer of the apparatus.

Normally, in a system having a plurality of modalities connected on a network or the like, there is a combination of modalities that can communicate using the DICOM protocol and modalities that must communicate using a protocol other than the DICOM protocol. In a system using a plurality of communication protocols, it is possible to switch sorter bins based on a patient ID, as described above, when a modality transmits the data using the DICOM protocol. However, when data is transmitted by a communication protocol other than DICOM that does not specify a patient ID as attribute data, it is not possible to switch sorter bins based on the patient ID.

SUMMARY OF THE INVENTION

In view of the foregoing, it is an object of the present invention to provide a method and apparatus for processing image output by receiving image data from a plurality of medical diagnostic imaging equipment via a network or dedicated channel and printing out the data. It is another object of the present invention to provide a method and apparatus for processing image output capable of automatically selecting and switching output sorter bins for data received from the plurality of medical diagnostic imaging equipment.

It is another object of the present invention to provide a method and apparatus for identifying a data output device capable of executing different output device identifying processes based on the communication protocol used for transferring the image data received via a network or the like, identifying the transmission source of the image data, such as the modality equipment that generated the image data, and switching the sorter bins based on the identification data in order to select and switch to the appropriate sorter bin even when the communication protocol attribute data does not contain a patient ID or the like that can be used to select a sorter bin.

According to one aspect of the present invention, these objects will be obtained by an image output processor for receiving data transmitted from a plurality of data processors connected to the image output processor and for outputting the data to a printer having a plurality of sorter bins, the image output processor comprising data transmission source identifying means for identifying the transmission source of data transmitted from the data processors; and sorter bin determining means for determining to which sorter bin to output the data received from the plurality of data processors based on the data transmission source identified by the data transmission source identifying means.

According to another aspect of the present invention, the image output processor and the plurality of data processors are connected via a network.

According to another aspect of the present invention, the image output processor and the plurality of data processors are connected via dedicated data communication channels.

According to another aspect of the present invention, the data transmission source identifying means identifies the source of data transmission by determining the communication channel used to transmit the data from the plurality of data processors; and the sorter bin determining means determines to which sorter bin to output data received from the plurality of data processors based on the communication channel identified by the data transmission source identifying means.

According to another aspect of the present invention, the sorter bin determining means comprises a sorter bin determining table that associates communication channels connecting the data processors to the image output processor with the sorter bins in the printer; and the sorter bin determining means references the sorter bin determining table to determine to which sorter bin to output received data based on the communication channel identified by the data transmission source identifying means.

According to another aspect of the present invention, the sorter bin determining means comprises a sorter bin determining table that associates the data processors connected to the image output processor with the sorter bins in the printer; and the sorter bin determining means references the sorter bin determining table to determine to which sorter bin to output received data based on the data processor identified as the data transmission source by the data transmission source identifying means.

According to another aspect of the present invention, the sorter bin determining means comprises a sorter bin determining table that associates attribute data included with the data transmitted from the plurality of data processors with the sorter bins in the printer; and the sorter bin determining means references the sorter bin determining table to determine to which sorter bin to output received data based on the attribute data identified by the data transmission source identifying means.

According to another aspect of the present invention, the data transmission source identifying means supports a plurality of communication protocols and executes different types of processes for identifying the data transmission source based on the communication protocol used to transmit the data from the plurality of data processors.

According to another aspect of the present invention, the sorter bin determining means executes a process for determining an appropriate printer to use in the output process.

According to another aspect of the present invention, the data processors are medical diagnostic imaging devices.

According to another aspect of the present invention, an image output processing method for receiving data transmitted from a plurality of data processors connected to the image output processor and outputting the data to a printer having a plurality of sorter bins, the image output processing method comprising the steps of identifying the data transmission source of data transmitted from the data processors; and determining to which sorter bin to output the data received from the plurality of data processors based on the data transmission source identified in the step for identifying the data transmission source.

According to another aspect of the present invention, the step for determining to which sorter bin to output the data comprises referencing a sorter bin determining table that associates data processors connected to the image output processor with sorter bins in the printer, according to the data processor identified as the data transmission source in the step for identifying the data transmission source.

The method and apparatus for processing image output according to the present invention processes printing requests from external devices, including such modality equipment as CT, CR, and MR scanners or computing devices such as a workstation that are connected serially to the image output processing device via a network or dedicated channel.

In particular, the apparatus for processing image output according to the present invention functions as a print server for controlling the printing process for printing medical diagnostic images provided from modality equipment. The images are printed on photosensitive film using printers having a plurality of sorter bins in which to output the printed film. The print server identifies the transmission source of the image data and switches sorter bins for printing based on the identified data.

The embodiments herein describe the features and advantages of the present invention with reference to the attached drawings.

BRIEF DESCRIPTION OF THE DRAWINGS

In the drawings:

FIG. 3 shows examples of sorter bin determining tables for the image output processor of the first embodiment;

FIG. 5 shows examples of sorter bin determining tables for the image output processor of the second embodiment;

FIG. 6 shows examples of sorter bin determining tables for the image output processor of the second embodiment;

FIG. 10 shows examples of sorter bin determining tables for the image output processor of the third embodiment.

DETAILED DESCRIPTION OF THE PREFERRED EMBODIMENT

A method and apparatus for processing image output according to preferred embodiments of the present invention will be described while referring to the accompanying drawings.

Figure 1:
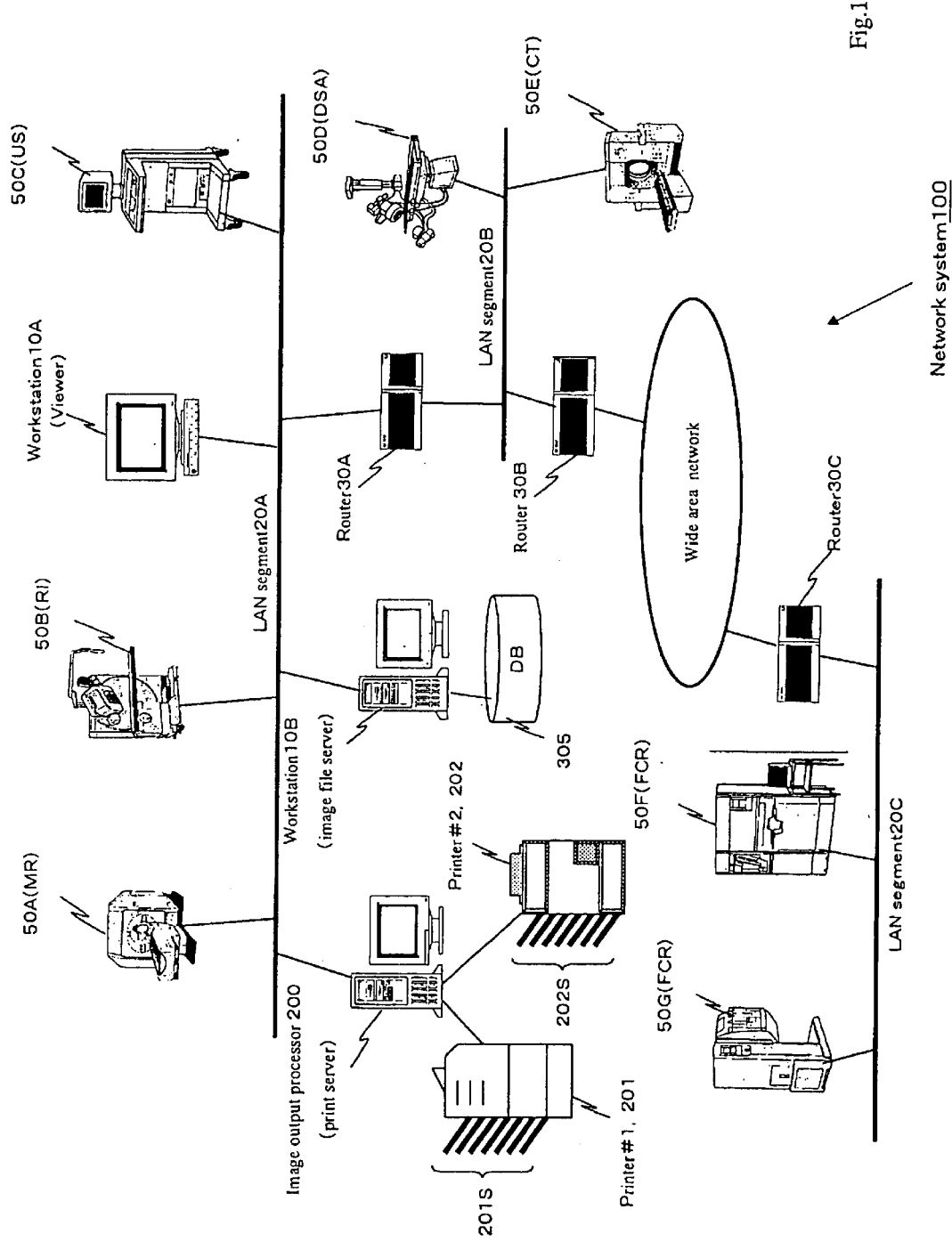
FIG. 1 is a conceptual diagram showing the structure of a network system for sharing medical images between terminal devices.

FIG. 1 is a conceptual diagram showing the structure of a network system 100 employing a method and apparatus for processing image output according to a first embodiment of the present invention.

In the network system 100 shown in FIG. 1, a plurality of medical modalities 50A–F and workstations 10A and 10B are connected by a network. The modalities 50A–F are those commonly found in the specialized examination rooms of hospitals. The modalities might include, for example, a magnetic resonance (MR) scanner 50A for use in computed tomography, a radioisotope (RI) device 50B, an ultrasound (US) device 50C, a digital substraction angiography (DSA) device 50D, a computed tomography (CT) scanner 50E, and a computed radiography (CR) device 50F. Medical images created by the plurality of modalities 50A–F on the network system 100 can be viewed on the workstation 10A, which includes a monitor, or transferred to the workstation 10B, which functions as a file server. The workstation 10B is provided with a database 305. Data transferred to the workstation 10B can be stored in the database 305.

The image viewer attached to the workstation 10A is a large high-resolution screen such as a cathode-ray tube (CRT) display. This image viewer enables the user to confirm the progression of a patient's recovery or condition on the display screen, for example, by extracting several past diagnostic images from the database 305.

The medical images scanned by the modalities 50A–F can be transferred to an image output processor 200 and output to a no. 1 printer 201 or a no. 2 printer 202 for printing the data on film. The image output processor 200 functions as a print server having one or more locally connected printers 201 and 202.

Before printing image data received from the modalities 50A–F, the image output processor 200 can perform various processes on the data. For example, the image output processor 200 can arrange the data in an appropriate format by laying out the data within a specified size of film and enlarging or reducing the image.

Ordinarily, the image output processor 200 is connected to a plurality of film printers 201 and 202 (only two printers are provided in the example of FIG. 1). Further, each film printer includes one or more trays in order to provide many types and sizes of film for the client. The number of printers that can be connected to one print server depends on the number of ports supported by the server application and the like.

Generally printers used for printing medical diagnostic images are film printers that print images on photosensitive film rather than on normal paper. Film is used as the recording medium for the reason that the image has a slightly higher resolution (a larger dynamic range, in particular) than images printed on normal paper, enabling a clearer view of the patients affected parts.

In addition, each film printer has different gradient capabilities, recording formats, resolutions, and other output capacities. The printers can print on film of various sizes, including 350×430 mm, 350×350 mm, and 360×240 mm (B4 size). There are also both blue and clear types of film. The recording format refers to the arrangement on a page of film, for example, the number of frames per page and the orientation (lengthwise or widthwise) on the page.

Providing an image output processor 200 on the network to function as a print server enables a plurality of modality equipment to share an expensive film printer. In other words, image files scanned by the modality equipment can be transferred to a remote print server for printing. Further, by providing the workstation 10B on the network, the image files can be stored in a shared database, enabling diagnostic data for many patients to be managed in the hospital. The diagnostic images can also be extracted from the workstation 10B at a later date to compare with the most recent images in order to monitor the effects of a treatment or the progression of a condition. Another workstation separate from the modality equipment can be provided on the network for referencing images.

The image output processor 200 receives image data via the network from each of the modalities 50A–F or the workstation 10A and outputs the image data for printing, selecting the appropriate printer 201 or 202. The no. 1 printer 201 and no. 2 printer 202 possess a plurality of sorter bins 201S and 202S, respectively. The image output processor 200 performs a sorter bin selection process to select one of the sorter bins in the specified printer for outputting the print data. This process is described in more detail later with reference to FIGS. 2 and 3.

The image output processor 200, workstations 10A and 10B, and modalities 50A–F are continually connected to a network by means of network interface cards (not shown). An example of this network construction is a single local area network (LAN) installed in a hospital. The LAN can be configured of a single LAN segment 20 or by a plurality of LAN segments interconnected via a router (or gateway) 30. The network may also be configured of a wide area network (WAN) connecting LANS of remote hospitals via dedicated channels or a WAN similar to the Internet.

Each workstation 10, each modality 50A–F, and the image output processor 200 and the like connected to the network communicate using prescribed communication protocols. According to the OSI standard model, the physical and data link layers of the network employ the Ethernet protocol, while the network and transport layers employ Transmission Control Protocol/Internet Protocol (TCP/IP). The session and higher layers can employ the Digital Imaging and Communication Protocol in Medicine (DICOM) described above or a combination of DICOM and a different communication protocol. The image output processor 200 has an interface capable of handling all communication protocols used on the network and a means for identifying the source of data transmissions. The latter device will be described in more detail later.

With the medical image communication network system 100 shown in FIG. 1, various medical diagnostic data obtained in the hospital can be stored in digital form and circulated and shared between a plurality of terminal devices connected to the network. In other words, diagnostic data obtained in one examination room can be referenced from a different examination room (or an examination room in a remote hospital). By extracting past diagnostic images from the database 305, it is possible to monitor the progression of a patient's recovery or condition. In addition, a plurality of modalities 50A–F and workstations 10 can share an expensive printer for outputting images obtained by the modalities 50A–F or extracted from the database 305.

With the configuration described above, a film printer is installed in a separate room, that is, in a remote location from the modalities 50A–F. For this reason, it is difficult to set output sorter bins while confirming each of the printing settings at the modality equipment 50 end, that is, the source of the printing request.

The image output processor 200 of the present invention receives image data output from the MR scanner 50A, RI device 50B, US device 50C, and the like or workstations 10 connected to the network. The image output processor 200 identifies the source of the transmission, selects a sorter bin appropriate for the transmission source, and outputs the print data for printing.

Figure 2:
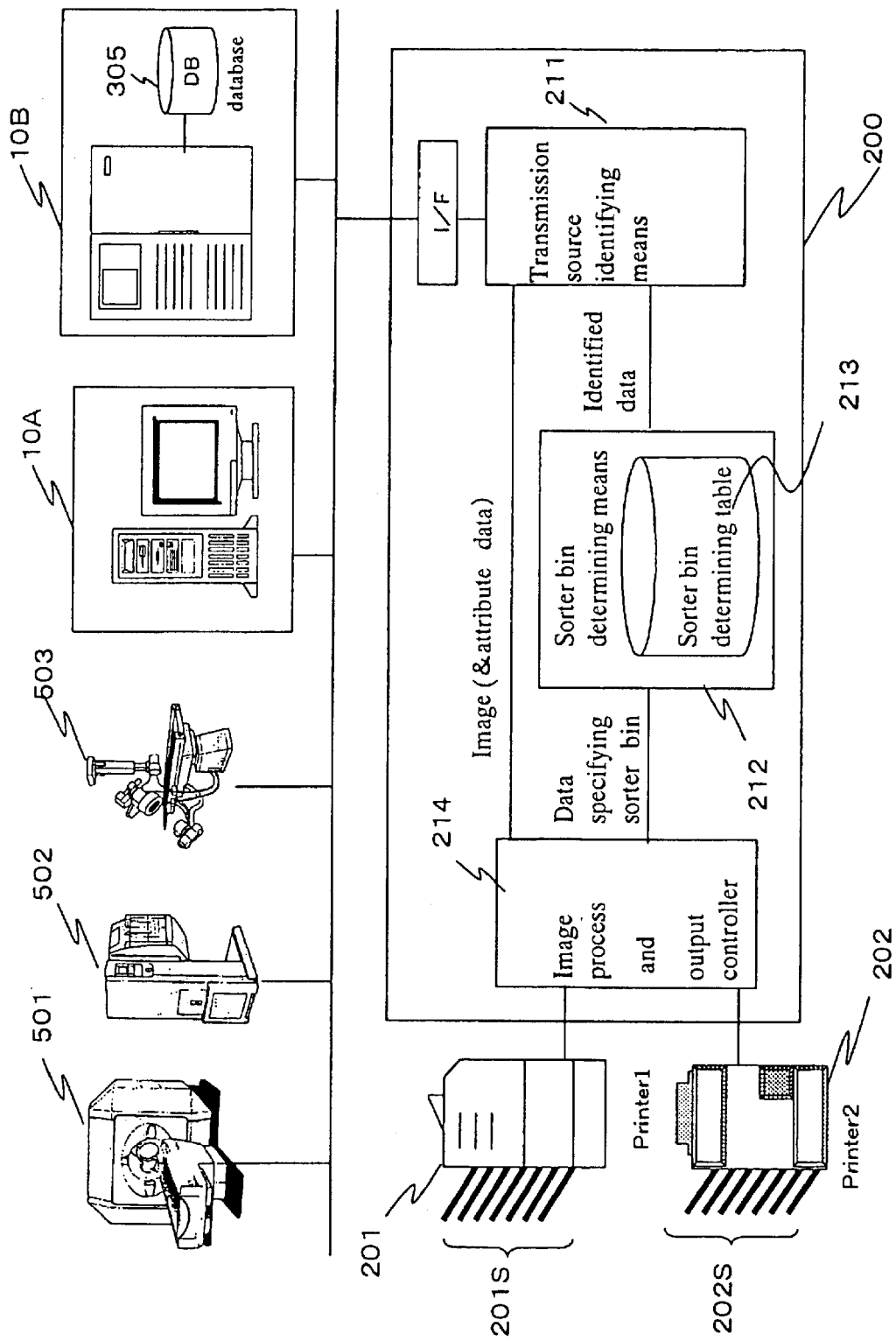
FIG. 2 is a block diagram showing a network system and an image output processor according to the first embodiment of the present invention.

FIG. 2 is a block diagram for describing the functions of the image output processor and showing the various devices connected to the network. The image output processor 200 is connected to the network via an interface. A plurality of modality devices 501, 502, and 503, which are diagnostic imaging devices, are also connected to the network; as are the workstation 10B, including the database 305; the workstation 10A, possessing an image display; and other equipment.

The modality devices 501–503 transmit various diagnostic image data to the image output processor 200. The workstation 10A is used to extract image data obtained by the modality devices 501–503 and stored in the database 305 and to view the data on the display. The workstation 10A can also be used to perform prescribed editing procedures on the imaging data or specify pages or areas of the data to print, and to transmit the image data to the image output processor 200.

After receiving image data from the workstation 10A, workstation 10B, or modality devices 501, 502, and 503, the image output processor 200 prints out the image data using locally connected printers 201 and 202. The printers 201 and 202 are provided with a plurality of sorter bins 201S and 202S respectively.

Next, the functions of the image output processor 200 will be described with reference to FIG. 2. After the image output processor 200 receives data from the workstation 10A, workstation 10B, or modality devices 501–503, a transmission source identifying section 211 executes a process for determining the source of the transmission. The transmission source identifying section 211 can handle a plurality of communication protocols used by each device connected to the network. First, the transmission source identifying section 211 executes a process for determining the modality device or workstation that is the source of the transmitted data based on the protocol used to transfer the data. For example, when data is received according to DICOM, a protocol widely used to communicate medical imaging data, an Application Entity Title is transmitted when the devices are establishing a data communication session. The transmission source identifying section 211 reads this Application Entity Title to identify the source of the data transmission. When the Fuji Information Network Protocol (FINP) is used, tag data for describing the transmitted images is sent in a step prior to transmitting the actual image data. The transmission source identifying section 211 extracts the Originating Device data included in the tag data to determine the source of the transmission. In this way, the transmission source identifying section 211 executes a process to identify the data transmission source based on the protocol used by each device on the network.

After determining the data transmission source, the transmission source identifying section 211 sends the identified data transmission source (device ID) to a sorter bin determining section 212.

Based on the device ID, the sorter bin determining section 212 determines an appropriate sorter bin in a printer to output the data. To aid in determining the appropriate sorter bin, the sorter bin determining section 212 maintains and references a sorter bin determining table 213.

FIG. 3 shows an example of sorter bin determining tables. Table (A) in FIG. 3 matches device IDs indicating data transmission source devices and corresponding sorter bin IDs. Table (B) in FIG. 3 matches device IDs with corresponding printer IDs and sorter bin IDs.

The sorter bin determining table in FIG. 3(A) matches devices that transmit image data, that is, the source of the transmission identified by the transmission source identifying section 211 with corresponding sorter IDs indicating the appropriate output sorter bins. The sorter bin determining table in FIG. 3(B) matches devices that transmit image data with corresponding printer IDs specifying appropriate printers to output the image data and sorter bin IDs indicating the appropriate output sorter bins.

The sorter bin determining table of FIG. 3(A) is used when only one printer is connected to the image output processor 200, or when one or more printers is connected to the image output processor 200 and an ID capable of identifying the sorter bins of each printer has been assigned.

The sorter bin determining table of FIG. 3(B) is used when a plurality of printers are connected to the image output processor 200. Data fields in this table include a device ID specifying the data transmission source, a printer ID identifying the printer to use, and a sorter bin ID identifying the sorter bin in the printer identified by the printer ID.

Based on the sorter bin determining table, the sorter bin determining section 212 selects an output sorter bin from the plurality of sorter bins provided in printers connected to the image output processor 200.

The sorter bin determining table 213 stores device IDs and their corresponding sorter bin IDs as in the example formats of FIGS. 3(A) and (B). The device IDs identify modality devices, servers, or other workstations that may request to print out an image, while sorter bin IDs identify sorter bins in printers. The sorter bin determining section 212 references the sorter bin determining table 213 based on the data transmission source determined by the transmission source identifying section 211 in order to determine an appropriate sorter bin for outputting the data.

Data specifying the sorter bin determined by the sorter bin determining section 212 is sent to an image process and output controller 214. The image process and output controller 214 processes the image data and controls the output destination of the data based on the sorter bin determined by the sorter bin determining section 212. The image process and output controller 214 outputs the processed data to a printer along with a command specifying the desired sorter bin.

The no. 1 printer 201 or no. 2 printer 202 outputs the processed image data received from the image output processor 200 to the sorter bin defined by the above command.

The image processes conducted by the image process and output controller 214 include a process for laying out images on a sheet of film and enlarging or reducing the images, for example. These processes are executed based on attribute data attached to the image data.

In the construction described above, a network image transferring system includes a plurality of medical diagnostic imaging devices connected via a network. A print server can easily sort image data transmitted from the plurality of devices by identifying the source of the transmitted data and selecting a sorter bin for outputting the data.

With the construction described above, the image output processor 200 can select an appropriate sorter bin even when image data is transmitted via the network using a plurality of different communication protocols. To accomplish this, the transmission source identifying section 211 of the image output processor 200 executes a process for identifying the source of transmission according to the protocol employed and selects a sorter bin based on the source of the data transmission.

Next, a second embodiment of the present invention will be described while referring to the accompanying drawings wherein like parts and components are designated by the same reference numerals to avoid duplicating description.

In the first embodiment the image output processor 200 executes a process to identify the data transmission source for all received data. However, the image output processor 200 can also be configured to determine the sorter bin for output based on a patient ID or other attribute data included with the image data and to execute a secondary process when a patient ID is not included in the attribute data. The secondary process includes identifying the data transmission source and determining the sorter bin based on this data transmission source.

A network system applying the structure of the second embodiment is similar to that of FIG. 1 described in the first embodiment, and the structure of devices connected to the network is the same as that in the first embodiment. Therefore, a description of these configurations will be omitted. Only points differing from the first embodiment will be described.

Figure 4:
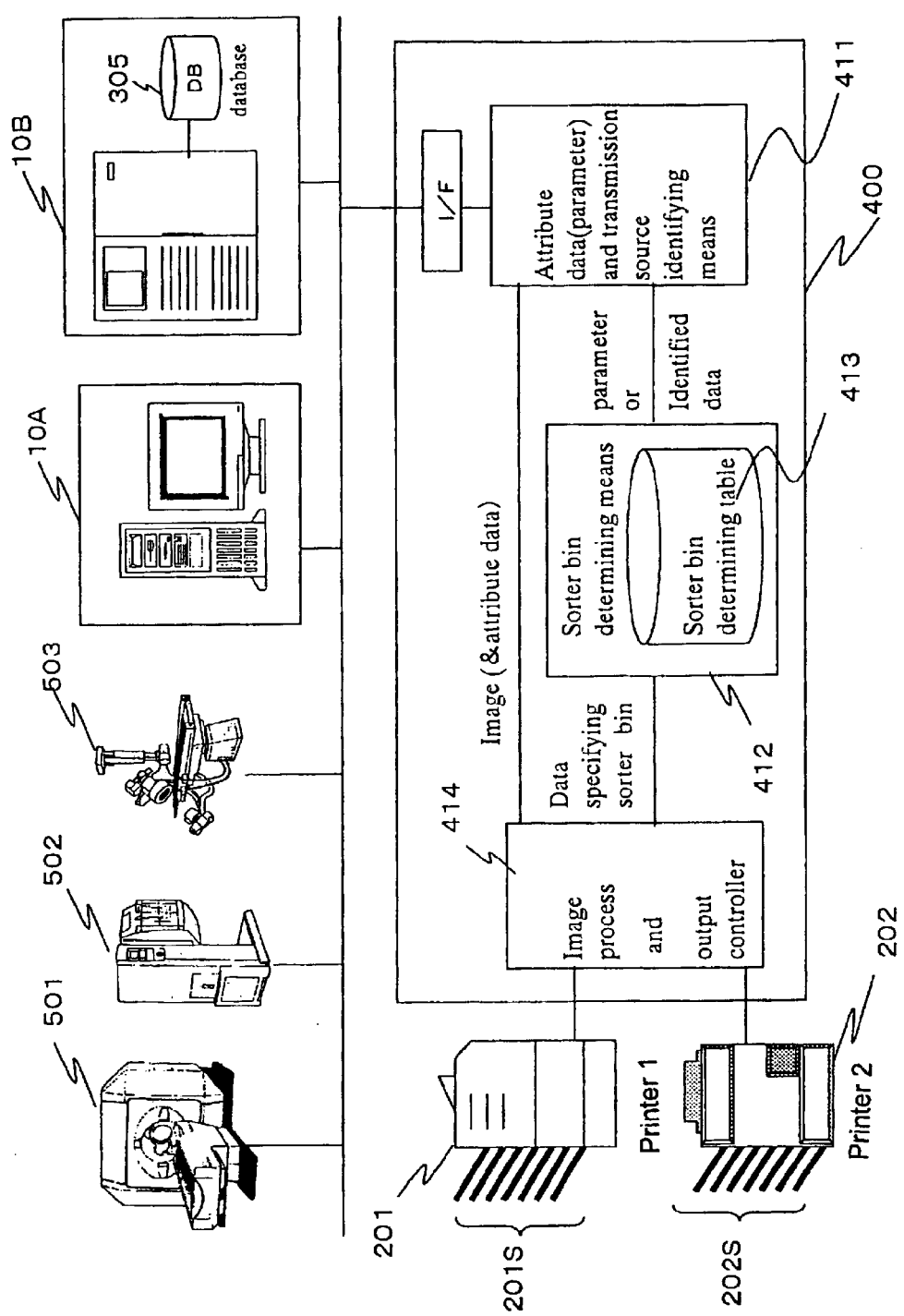
FIG. 4 is a block diagram showing a network system and an image output processor according to the second embodiment of the present invention.

FIG. 4 is a block diagram showing the configuration of the image output processor according to the present embodiment. An image output processor 400 is connected to the network via an interface. A plurality of modality devices 501, 502, and 503, which are diagnostic imaging devices, are also connected to the network, as are the workstation 10B, including the database 305; the workstation 10A, possessing an image display; and other equipment.

The modality devices 501–503 transmit various diagnostic image data to the image output processor 400. The workstation 10A is used to extract image data obtained by the modality devices 501–503 and stored in the database 305 and to view the data on the display. The workstation 10A can also be used to perform prescribed editing procedures on the imaging data or to specify pages or areas of the data to print, and to transmit the image data to the image output processor 400.

After receiving image data from the workstation 10A, workstation 10B, or modality devices 501, 502, and 503, the image output processor 400 prints out the image data using locally connected printers 201 and 202. The printers 201 and 202 are provided with a plurality of sorter bins 201S and 202S respectively.

Next, the functions of the image output processor 400 will be described with reference to FIG. 4. After the image output processor 400 receives data from the workstation 10A, workstation 10B, or modality devices 501–503, an attribute data and transmission source identifying section 411 extracts attribute data established by the protocol for determining a sorter bin for print output.

The attribute data and transmission source identifying section 411 contains definitions of each class of data required to determine the sorter bin for output based on the communication protocol used. The attribute data and transmission source identifying section 411 executes a process to extract this data. For example, if attribute data included with image data transmitted by the DICOM protocol contains a patient ID as the data required to determine a sorter bin, the patient ID is extracted from the attribute data. If a protocol-A specifies that a physician ID in the attribute data is required to determine the sorter bin for transmitted image data, then the physician ID is extracted from the attribute data. When data is received by a communication protocol that does not specify an attribute in the attribute data for selecting a sorter bin, then the data transmission source is viewed as the sorter bin determining data. In this case, the attribute data and data transmission source identifying process section 411 executes the process to identify the data transmission source is executed. The attribute data and transmission source identifying section 411 outputs the result of this data transmission source identifying process to a sorter bin determining section 412.

In the DICOM protocol described above, for example, attribute data such as a patient ID, print image layout, frame number, film size and type, image polarity, density, and number of output sheets is marked by an identifier of several bytes. The identifier, or tag, is transmitted to the image output processor 400. If the DICOM protocol specifies that the output sorter bin is defined based on the patient ID included with the image data, then the attribute data and transmission source identifying section 411 extracts the patient ID identified by the tag from the received data and sends the ID to the sorter bin determining section 412.

If data is received according to a communication protocol that does not define attribute data for selecting a sorter bin, then the attribute data and transmission source identifying section 411 executes a process to determine the modality device or server that transmitted the data based on the protocol used. For example, if data is transmitted using the FINP protocol, tag data for describing the transmitted images is transmitted prior to transmitting the actual image data. The attribute data and transmission source identifying section 411 extracts the originating Device data included in the tag data to determine the source of the transmission. In this way, the attribute data and transmission source identifying section 411 executes a process to identify the data transmission source based on the protocol used by each device on the network.

However, if attribute data is defined by the communication protocol for determining the sorter bin, but no valid data exists for the relevant attribute, then the attribute data and transmission source identifying section 411 executes a process to identify the data transmission source. Therefore, if data is received by the DICOM protocol, which defines the patient ID as data for determining the sorter bin, but no valid data exists for the patient ID, then the attribute data and transmission source identifying section 411 executes the process to identify the data transmission source. To execute a process for identifying the data transmission source when the protocol is DICOM, the attribute data and transmission source identifying section 411 identifies the Application Entity Title transmitted when establishing a data communication session and identifies the source of the data transmission based on this data.

After the attribute data and transmission source identifying section 411 determines the attribute data for selecting a sorter bin or the data transmission source, the attribute data and transmission source identifying section 411 transfers this attribute data or data transmission source (device ID) to the sorter bin determining section 412.

The sorter bin determining section 412 determines an appropriate printer sorter bin for outputting the data based on attribute data for selecting the sorter bin or the data transmission source (device ID). To aid in determining the appropriate sorter bin, the sorter bin determining section 412 maintains and references a sorter bin determining table 413.

FIG. 5 shows an example of sorter bin determining tables. Table (A) in FIG. 5 matches patient IDs to their corresponding sorter bin IDs. Table (B) in FIG. 5 matches physician IDs to their corresponding sorter bin IDs. Table (C) in FIG. 5 matches device IDs indicating the data transmission source with their corresponding sorter bin IDs.

The sorter bin determining section 412 determines the output sorter bin by referencing the sorter bin determining table 413 based on data input from the attribute data and transmission source identifying section 411. Table (A) in FIG. 5 matching corresponding patient IDs and sorter bin IDs is used when determining an output sorter bin based on a patient ID extracted from the attribute data when the image data is transmitted by the DICOM protocol. Table (B) in FIG. 5 matching corresponding physician IDs and sorter bin IDS is used when determining the output sorter bin based on a patient ID extracted from attribute when the image data was transmitted by communication protocol-A. Table (C) in FIG. 5 matching corresponding device IDs and sorter bin IDs is used to perform a process to determine the output sorter bin when the image data was transferred by a communication protocol other than DICOM or protocol-A.

FIG. 5 shows three examples of tables, each having different referencing IDs. These tables can be combined into one table, providing that the referencing IDs, such as the patient ID, physician ID, and device ID do not duplicate each other.

FIG. 6 shows the construction of a table combining the three tables in FIG. 5. The fields used in this table include only a sorter bin selection data ID and a sorter bin ID. The sorter bin selection data ID combines the patient ID, physician ID, and device ID from the three tables in FIG. 5. These IDs are constructed so as not to duplicate each other. Accordingly, the sorter bin determining section 412 determines a corresponding sorter bin by searching the table shown in FIG. 6 using data input from the attribute data and transmission source identifying section 411, regardless of whether the data is attribute data or a device ID for the data transmission source.

Sorter bin specification data determined by the sorter bin determining section 412 is sent to an image process and output control section 414. The image process and output control section 414 processes the image data and controls the output destination of the data based on the sorter bin determined by the sorter bin determining section 412. The image process and output control section 414 then outputs the processed data to a printer along with a command specifying the sorter bin.

The no. 1 printer 201 or no. 2 printer 202 outputs the processed image data received from the image output processor 400 to the sorter bin defined by the above command.

The image processes conducted by the image process and output control section 414 include a process for laying out images on a sheet of film and enlarging or reducing the images, for example. These processes are executed based on attribute data attached to the image data.

Figure 7:
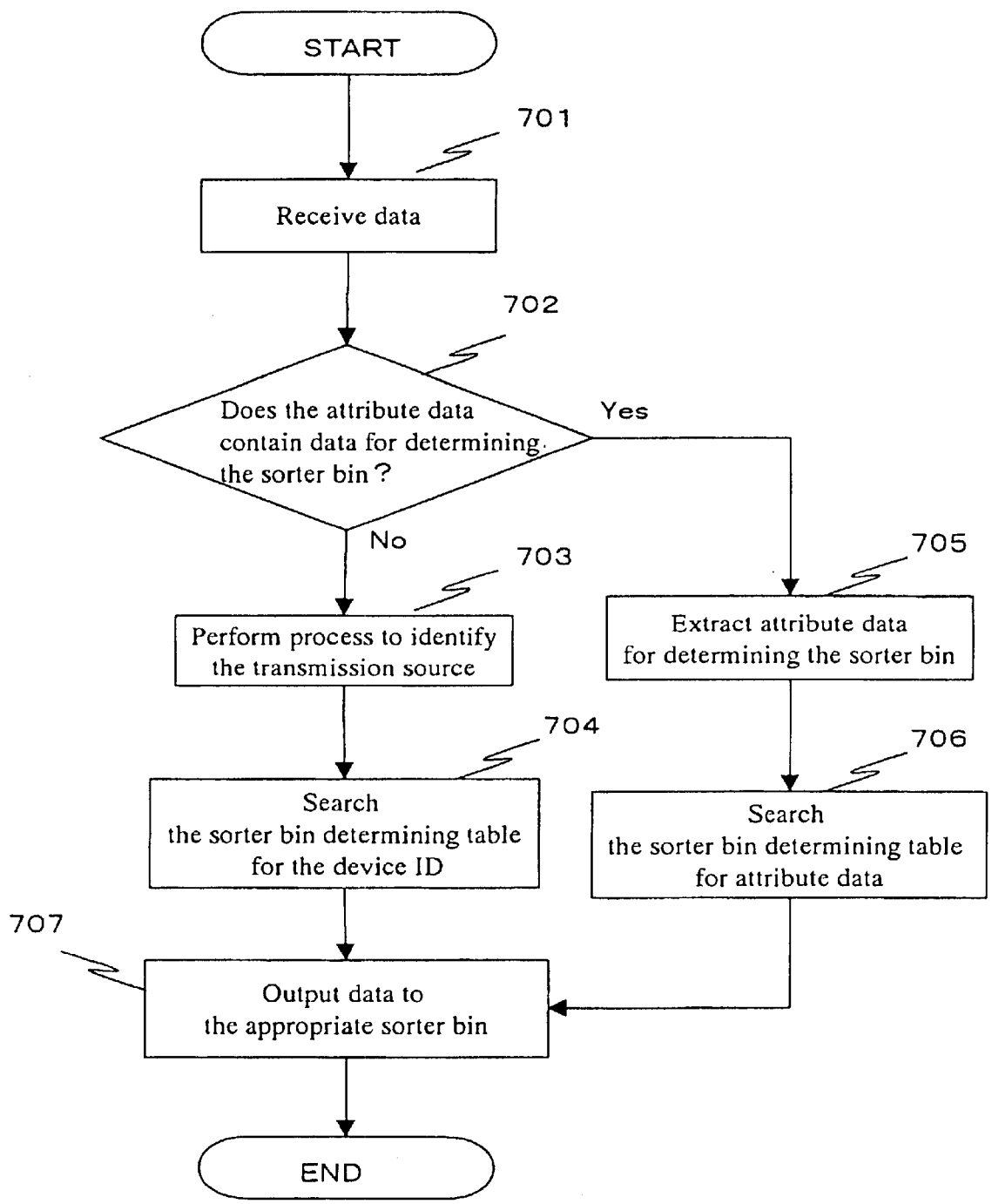
FIG. 7 is a flowchart showing the process executed by the image output processor of the second embodiment.

Next, a method for processing image output using the image output processor of the present invention as a print server will be described with reference to FIG. 7. FIG. 7 is a flowchart showing the method for processing image data of the present invention. Next, each step of the flowchart will be described.

The process in FIG. 7 begins in Step 701 when the print server receives data transmitted from a data transmission device via the network. After the data is received, the process for determining a sorter bin begins from Step 702.

In step 702, the attribute data and transmission source identifying section 411 determines whether data included in the attribute data is used for specifying the sorter bin. This information is predefined according to the communication protocol used for transmitting the data. For example, if the DICOM protocol defines the patient ID as data for determining the sorter bin and data using the DICOM protocol is received (Yes in Step 702), then the patient ID is identified according to the tag identifier described above, located in the attribute data, and extracted as data for determining the sorter bin (Step 705). However, if no valid data exists in the relevant attribute data, then the determination in Step 702 is No, even if the communication protocol specifies attribute data for determining the sorter bin. Accordingly, even if data is transmitted using the DICOM protocol, if no valid data exists in the appropriate attribute data (No in Step 702), then the process for determining the data transmission source is executed in Step 703.

When the communication protocol used to receive the data does not specify data in the attribute data for determining a sorter bin, the process for identifying the data transmission source is executed in Step 703. This process varies according to the communication protocol. For example, when FINP is used as the communication protocol as described above, tag data concerning the transmitted images is transferred before the image data is transferred. Originating Device data is extracted from the device data to determine the source of the data transmission. When the protocol is DICOM, an Application Entity Title transferred when the data communication session is established can be identified and used to identify the data transmission source.

After the process in Step 703 has completed, a process for referencing the sorter bin determining table based on the device ID is executed in Step 704. As described above, this referencing process is implemented using tables such as those shown in FIGS. 3 and 5(A).

However, if data for determining a sorter bin exists in the attribute data (Yes in Step 702), then this data is extracted from the attribute data in Step 705, and a sorter bin determining table corresponding to the attribute data is referenced in Step 706. Examples of the table referenced in Step 706 are shown in FIGS. 5(B) and (C).

After a sorter bin for data output is determined in Step 704 or 706, data that has undergone prescribed imaging processes such as a layout process is output to the sorter bin specified in either Step 704 or 706.

In the construction described above, a network image transferring system includes a plurality of medical diagnostic imaging devices connected via a network. A print server can easily sort image data transmitted from the plurality of devices by identifying the source of the transmitted data and selecting a sorter bin for outputting the data.

With the construction described above, the image output processor 400 can select an appropriate sorter bin even when image data is transmitted via the network using a plurality of different communication protocols. To accomplish this, the attribute data and transmission source identifying section 411 extracts attribute data for selecting a sorter bin prearranged according to the communication protocol and selects a sorter bin. Therefore, an output destination can be determined using one of various IDs, such as a patient or physician ID, in the attribute data as defined by the communication protocol.

Further, when data is transmitted by a communication protocol that has no attribute data for selecting an output destination, a sorter bin can be selected based on a data transmission source. Accordingly, output data can be sorted orderly on a network system using a mixture of communication protocols.

The tables given in FIG. 5 represent only one example, while there are numerous attribute data in addition to patient and physician IDs that can be used to select a sorter bin. For example, when model data for the image generating device is included in the attribute data, it is possible to create a table matching model data to corresponding sorter bins in order to determine the output sorter bin. If an examination room ID is included in the attribute data to determine an output sorter based on the examination room ID, it is possible to create a table matching examination room IDs with corresponding output sorter bins to accomplish this.

When there are a plurality of printers connected to the image output processor 400, the sorter bin determining table can be configured with such data fields as a printer ID for identifying a printer and a sorter bin ID for identifying a sorter bin in the identified printer, as shown in FIG. 3(B).

Next, a third embodiment of the present invention will be described with reference to FIGS. 8–10. In the first and second embodiments above, a sorter bin determining process for a network system was described. However, a method and apparatus for processing image output according to the present invention can also be applied when the modality devices or servers are connected to the image output processor by dedicated channels. This configuration will be described as the third embodiment.

Figure 8:
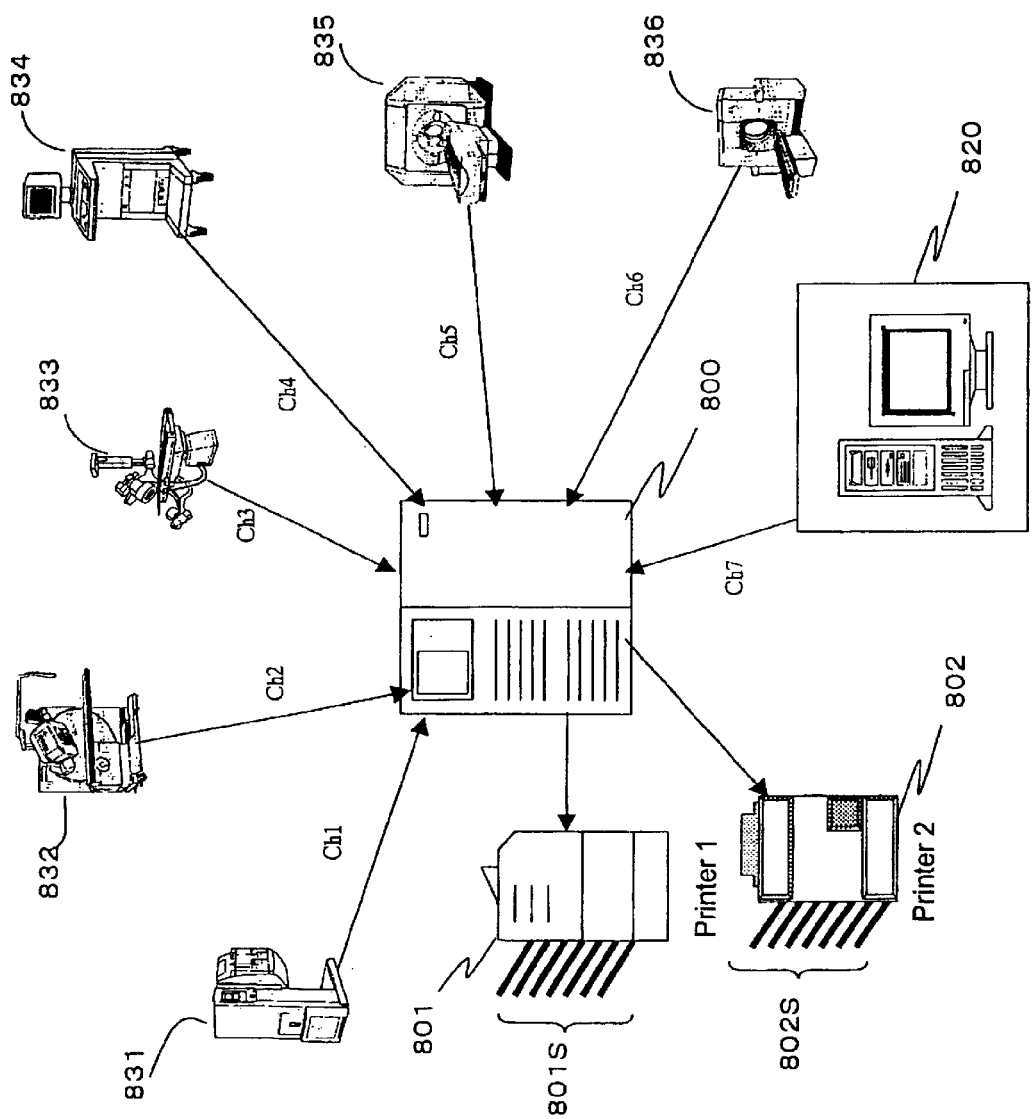
FIG. 8 is a conceptual diagram showing the structure of a network system for sharing medical images between terminal devices.

FIG. 8 shows an image output processor 800 of the present invention used in a communication processing system. Various modalities 831–836 are connected to the image output processor 800 by dedicated channels. When receiving image data the image output processor 800 can determine which modality transmitted the image data by identifying the input channel. Printers 801 and 802 are connected to the image output processor 800 and are provided with a plurality of sorter bins 801S and 802S, respectively.

The image output processor 800 contains settings data defining output sorter bins for each channel. For example, image data received from the modality 831 is output to a sorter no. 001 of the sorter bin 801S in the printer 801.

As shown in FIG. 8, a modality, workstation, server, or the like inputting image data via any of the channels 1–7 is determined based on the input channel used. A correspondence between each of the channels and the sorter bins is preset.

Figure 9:
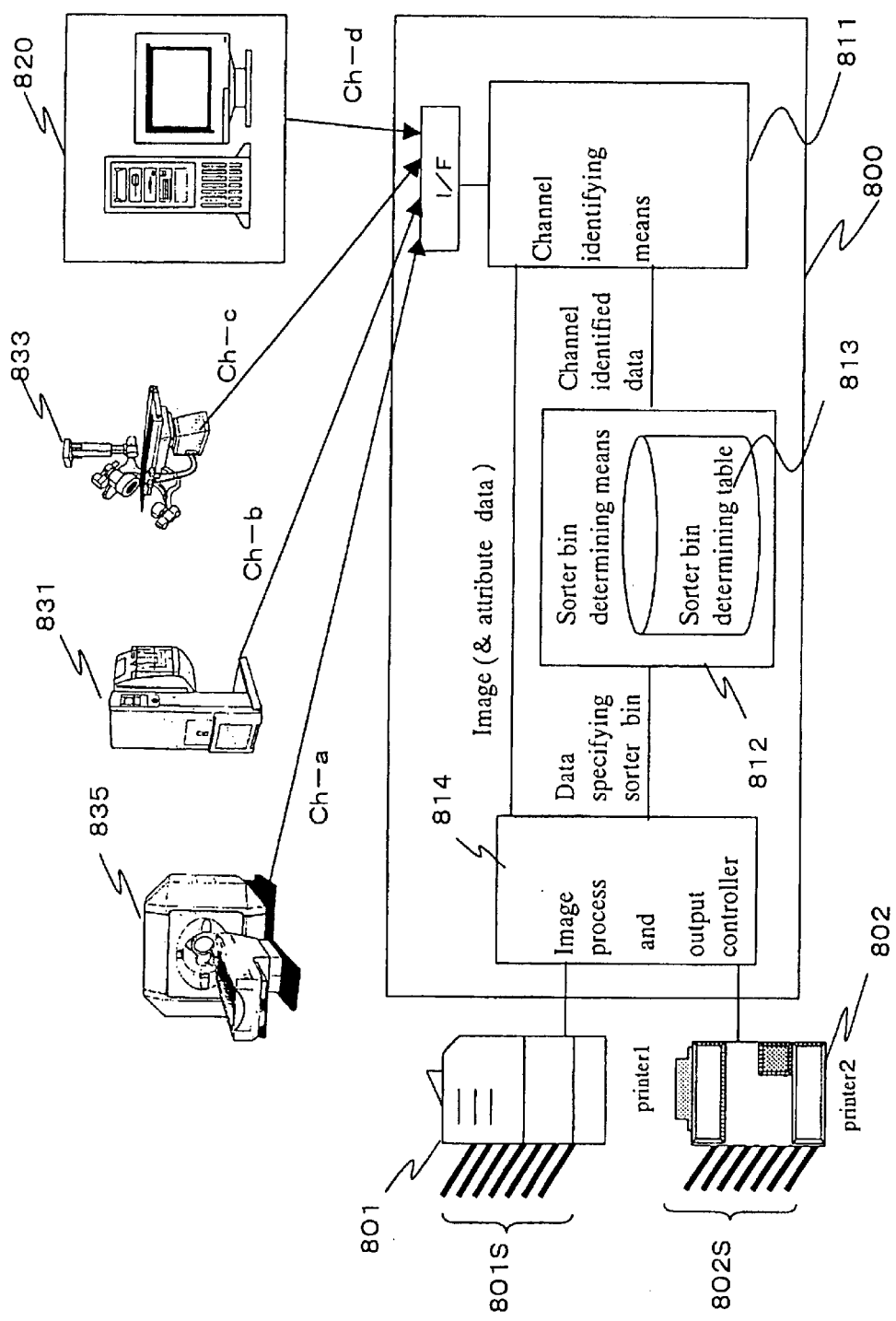
FIG. 9 is a block diagram showing a network system and an image output processor according to the first embodiment of the present invention.

FIG. 9 is a block diagram for describing functions of the image output processor according to the present embodiment. The image output processor 800 is connected to various devices by dedicated channels via an interface. A workstation 820 and various modality devices 831, 833, and 835 (as shown in FIG. 9) are connected to the image output processor 800 via dedicated channels ch-(a–d). The workstation and modality devices connected to the dedicated channels transmit various diagnostic imaging data to the image output processor 800. The workstation 820 may be used, for example, to extract past data from the modality devices 831–836 stored in a database (not shown) and displayed for the user. The workstation 820 can also be used to set the pages and areas to be printed or to perform prescribed editing processes on the image data before transmitting the image data to the image output processor 800.

After receiving image data from the workstation 820 or modalities 831–836, the image output processor 800 functioning as a print server outputs image data for printing on the printers 801 and 802 connected locally to the image output processor 800. The printers 801 and 802 are provided with a plurality of sorter bins for sorting output.

Next, the functions of the image output processor will be described according to the block diagram in FIG. 9. After the image output processor 800 receives data from the workstation 820 or modalities 831–836, an input channel identifying section 811 identifies the input channel. After determining the input channel, the input channel identifying section 811 sends the identified data input channel (channel ID) to a sorter bin determining section 812.

The sorter bin determining section 812 determines an appropriate sorter bin in the sorter bins 801S and 802S of the printers 801 and 802 to output the data based on the data input channel (channel ID). For determining the appropriate sorter bin, the sorter bin determining section 812 maintains and references a sorter bin determining table 813.

FIG. 10 shows an example of sorter bin determining tables. Table (A) in FIG. 10 matches channel IDs specifying data input channels to their corresponding sorter bin IDS. Table (B) in FIG. 10 matches channel IDs specifying data input channels to their corresponding printer IDs and sorter bin IDs.

The sorter bin determining table of FIG. 10(A) can be used when one or a plurality of printers are connected to the image output processor 800, providing there are assigned IDs capable of identifying each of the sorter bins in the plurality of printers.

The sorter bin determining table of FIG. 10(B) is used when a plurality of printers is connected to the image output processor 800. Data fields in this table include a channel ID specifying a data input channel, a printer ID identifying a printer, and a sorter bin ID identifying a sorter bin in the identified printer.

Based on the sorter bin determining table, the sorter bin determining section 812 selects an output sorter bin from the plurality of sorter bins in printers connected to the image output processor 800.

Data specifying the sorter bin determined by the sorter bin determining section 812 is sent to an image process and output control section 814. The image process and output control section 814 processes the image data and controls the output destination of the data based on the sorter bin determined by the sorter bin determining section 812. The image process and output control section 814 outputs the processed data along with a command specifying the sorter bin to a printer.

The printer 801 or 802 outputs the processed image data received from the image output processor 800 to the sorter bin defined by the above command.

In the construction described above, an image transferring system includes a plurality of medical diagnostic imaging devices connected via dedicated channels. A print server can easily sort image data transmitted from the plurality of devices by identifying the source of the transmitted data according to the input channel and selecting a sorter bin for outputting the data.

While the invention has been described in detail with reference to specific embodiments thereof, it would be apparent to those skilled in the art that many modifications and variations may be made therein without departing from the spirit of the invention, the scope of which is defined by the attached claims. For example, the present invention applies to an image output processor constructed by combining the method of selecting a sorter bin based on attribute data, as described in the second embodiment, and an image data communication system using dedicated channels, as described in the third embodiment.

As described above, a network image transferring system comprises a network connecting a plurality of medical diagnostic imaging devices. In this network image transferring system, a method and apparatus for processing image output according to the present invention is capable of identifying a device transferring image data via the network and automatically selecting and switching output sorter bins for the data according to the source of the data transmission.

The method and apparatus for processing image output according to the present invention can select an output sorter bin for image data received via the network based on either attribute data or the device that transmitted the image data, depending on the communication protocol. This configuration effectively prevents output confusion when various communication protocols are being used on the network.

A method and apparatus for processing image output according to the present invention can automatically sort image data received via dedicated channels by identifying the channel on which data was received and selecting a sorter bin based on the identified channel.

What is claimed is:

1. An image output processor for receiving data transmitted from a plurality of data processors connected to the image output processor and for outputting the data to a printer having a plurality of sorter bins, the image output processor comprising:

data transmission source identifying means for uniquely identifying one of the data processors as a data transmission source of data received by the image output processor, wherein the data transmission source identifying means supports a plurality of communication protocols and executes different types of processes for identifying the data transmission source based on the communication protocol used to transmit the data from the plurality of data processors; and sorter bin determining means for determining to which sorter bin to output the data received from the plurality of data processors based on the data transmission source identified by the data transmission source identifying means.

2. An image output processor for receiving data transmitted from a plurality of data processors connected to the image output processor and for outputting the data to a printer having a plurality of sorter bins, the image output processor comprising:

data transmission source identifying means for identifying a transmission source of data transmitted from the data processors, wherein the data transmission source identifying means supports a plurality of communication protocols and executes different types of processes for identifying the transmission source based on the communication protocol used to transmit the data from the plurality of data processors; and sorter bin determining means for determining to which sorter bin to output the data received from the plurality of data processors based on the data transmission source identified by the data transmission source identifying means, wherein the image output processor and the plurality of data processors are connected via a network.

3. An image output processor as claimed in claim 1, wherein the image output processor and the plurality of data processors are connected via dedicated data communication channels.

4. An image output processor for receiving data transmitted from a plurality of data processors connected to the image output processor and for outputting the data to a printer having a plurality of sorter bins, the image output processor comprising:

data transmission source identifying means for identifying a transmission source of data transmitted from the data processors; and sorter bin determining means for determining to which sorter bin to output the data received from the plurality of data processors based on the data transmission source identified by the data transmission source identifying means, wherein the data transmission source identifying means identifies the source of data transmission by determining a communication channel used to transmit the data from the plurality of data processors; and the sorter bin determining means determines to which sorter bin to output data received from the plurality of data processors based on the communication channel identified by the data transmission source identifying means.

5. An image output processor as claimed in claim 4, wherein the sorter bin determining means comprises a sorter bin determining table that associates communication channels connecting the data processors to the image output processor with the sorter bins in the printer; and the sorter bin determining means references the sorter bin determining table to determine to which sorter bin to output received data based on the communication channel identified by the data transmission source identifying means.

6. An image output processor as claimed in claim 1, wherein the sorter bin determining means comprises a sorter bin determining table that associates the data processors connected to the image output processor with the sorter bins in the printer; and the sorter bin determining means references the sorter bin determining table to determine to which sorter bin to output received data based on the data processor identified as the data transmission source by the data transmission source identifying means.

7. An image output processor as claimed in claim 1, wherein the sorter bin determining means comprises a sorter bin determining table that associates attribute data included with the data transmitted from the plurality of data processors with the sorter bins in the printer; and the sorter bin determining means references the sorter bin determining table to determine to which sorter bin to output received data based on the attribute data identified by the data transmission source identifying means.

8. An image output processor as claimed in claim 1, wherein the sorter bin determining means executes a process for determining an appropriate printer to use in the output process.

9. An image output processor as claimed in claim 1, wherein the data processors are medical diagnostic imaging devices.

10. An image output processing method for receiving data transmitted from a plurality of data processors connected to an image output processor and outputting the data to a printer having a plurality of sorter bins, the image output processing method comprising the steps of:

uniquely identifying one of the data processors as a data transmission source of data received by the image output processor according to a communication protocol utilized to transmit the data, wherein the data processors transmit the data to the image output processor using a plurality of different communication protocols; and determining to which sorter bin to output the data received from the plurality of data processors based on the data transmission source which has been identified.

11. An image output processing method as claimed in claim 10, wherein the step for determining to which sorter bin to output the data comprises referencing a sorter bin determining table that associates data processors connected to the image output processor with sorter bins in the printer, according to the data processor identified as the data transmission source in the step for identifying the data transmission source.

12. The image output processor as claimed in claim 1, wherein the data transmission source identifying means uniquely identifies one of the data processors as the data transmission source of the data received by the image output processor by extracting originating device data from data transmitted prior to the data received by the image output processor.

13. The image output processing as claimed in claim 10, wherein the step of uniquely identifying one of the data processors as the data transmission source comprises extracting originating device data from tag data transmitted prior to the image data and uniquely identifying one of the data processors as the data transmission source based on the originating device data.

14. An image output processor for receiving image data transmitted from a plurality of data processors connected to the image output processor and for outputting the image data to at least one printer having a plurality of sorter bins, the image output processor comprising:

attribute data and data transmission source identifying means for identifying attribute data for selecting a sorter bin if the attribute data is received with the image data, and uniquely identifying a particular data processor among the data processors as a data transmission source of the image data if the attribute data is not received with the image data, wherein the attribute data and data transmission source identifying means identifies the attribute data or the particular data processor according to a communication protocol utilized to transmit the image data, and the data processors transmit the image data to the image output processor using a plurality of different communication protocols; and sorter bin determining means for determining to which sorter bin to output the image data received from the plurality of data processors based on the attribute data or the particular data processor identified as the data transmission source by the attribute data and data transmission source identifying means.

15. The image output processor as claimed in claim 14, wherein the attribute data comprises at least one patient identification information and physician identification information.

16. An image output processing method for receiving image data transmitted from a plurality of data processors connected to the image output processor and outputting the image data to at least one printer having a plurality of sorter bins, the image output processing method comprising the steps of:

identifying attribute data for selecting a sorter bin if the attribute data is received with the image data, and uniquely identifying a particular data processor among the data processors as a data transmission source of the image data if the attribute data is not received with the image data, wherein the attribute data or the particular data processor is identified according to a communication protocol utilized to transmit the image data, and the data processors transmit the image data to the image output processor using a plurality of different communication protocols; and determining a particular sorter bin among the plurality of sorter bins to receive a printed image corresponding to the image data based on the attribute data or the particular data processor which has been identified.

17. The image output processing method as claimed in claim 16, wherein the attribute data comprises at least one patient identification information and physician identification information.

* * * * *